US012373239B2

(12) United States Patent
Vully et al.

(10) Patent No.: US 12,373,239 B2
(45) Date of Patent: *Jul. 29, 2025

(54) TRANSITIONING VOLUMES BETWEEN STORAGE VIRTUAL MACHINES

(71) Applicant: NetApp Inc., San Jose, CA (US)

(72) Inventors: Vani Vully, Bangalore (IN); Avishek Chowdhury, Bangalore (IN); Balaji Ramani, Bangalore (IN); Vasudev Mulchandani, Bangalore (IN)

(73) Assignee: NetApp, Inc., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 18/527,578

(22) Filed: Dec. 4, 2023

(65) Prior Publication Data

US 2024/0176645 A1 May 30, 2024

Related U.S. Application Data

(63) Continuation of application No. 16/908,909, filed on Jun. 23, 2020, now Pat. No. 11,836,513, which is a (Continued)

(51) Int. Cl.
*G06F 9/455* (2018.01)
*G06F 3/06* (2006.01)
(Continued)

(52) U.S. Cl.
CPC ........ *G06F 9/45558* (2013.01); *G06F 3/0619* (2013.01); *G06F 3/0647* (2013.01);
(Continued)

(58) Field of Classification Search
CPC .. G06F 9/45558; G06F 16/188; G06F 16/183; G06F 3/0619; G06F 3/0647;
(Continued)

(56) References Cited

U.S. PATENT DOCUMENTS 6,938,039 B1   8/2005   Bober et al.
7,610,318 B2   10/2009  Bartfai et al.
(Continued)

OTHER PUBLICATIONS

Advisory Action mailed Apr. 2, 2018 for U.S. Appl. No. 15/045,179, filed Feb. 16, 2016, 3 pages.
(Continued)

*Primary Examiner* — April Y Blair
*Assistant Examiner* — Jonathan R Labud
(74) *Attorney, Agent, or Firm* — Cooper Legal Group, LLC

(57) ABSTRACT

A volume rehost tool migrates a storage volume from a source virtual server within a distributed storage system to a destination storage server within the distributed storage system. The volume rehost tool can prevent client access to data on the volume through the source virtual server until the volume has been migrated to the destination virtual server. The tool identifies a set of storage objects associated with the volume, removes configuration information for the set of storage objects, and removes a volume record associated with the source virtual server for the volume. The tool can then create a new volume record associated with the destination virtual server, apply the configuration information for the set of storage objects to the destination virtual server, and allow client access to the data on the volume through the destination virtual server.

20 Claims, 5 Drawing Sheets

Related U.S. Application Data continuation of application No. 15/045,179, filed on Feb. 16, 2016, now Pat. No. 10,725,806.

(51) Int. Cl.
*G06F 16/182* (2019.01)
*G06F 16/188* (2019.01)

(52) U.S. Cl.
CPC ............ *G06F 3/067* (2013.01); *G06F 16/183* (2019.01); *G06F 16/188* (2019.01); *G06F 2009/4557* (2013.01); *G06F 2009/45579* (2013.01); *G06F 2009/45595* (2013.01)

(58) Field of Classification Search
CPC ............ G06F 3/067; G06F 2009/4557; G06F 2009/45579; G06F 2009/45595
See application file for complete search history.

(56) References Cited

U.S. PATENT DOCUMENTS

| | | |
|---|---|---|
| 7,664,991 B1 | 2/2010 | Gunda et al. |
| 8,073,816 B1 | 12/2011 | Luke et al. |
| 8,126,847 B1 | 2/2012 | Zheng et al. |
| 8,327,102 B1 | 12/2012 | Palsule et al. |
| 8,352,717 B2 * | 1/2013 | Campbell ............... G06F 9/441 713/2 |
| 8,566,125 B1 | 10/2013 | Perry et al. |
| 9,870,366 B1 | 1/2018 | Duan et al. |
| 10,725,806 B2 | 7/2020 | Vully et al. |
| 11,836,513 B2 | 12/2023 | Vully et al. |
| 2003/0167380 A1 | 9/2003 | Green et al. |
| 2003/0191810 A1 | 10/2003 | Muhlestein et al. |
| 2004/0268073 A1 | 12/2004 | Morisawa |
| 2007/0220308 A1 | 9/2007 | Yeung et al. |
| 2008/0005201 A1 | 1/2008 | Ting et al. |
| 2008/0288795 A1 * | 11/2008 | Maruyama ............ G06F 1/3221 713/320 |
| 2010/0083285 A1 | 4/2010 | Bahat et al. |
| 2010/0114889 A1 | 5/2010 | Rabii et al. |
| 2011/0072224 A1 | 3/2011 | Popovski et al. |
| 2012/0096235 A1 | 4/2012 | Lehr et al. |
| 2012/0144110 A1 | 6/2012 | Smith |
| 2012/0278553 A1 | 11/2012 | Mudhiganti et al. |
| 2013/0173547 A1 | 7/2013 | Cline et al. |
| 2015/0347548 A1 | 12/2015 | Mortensen et al. |
| 2015/0378783 A1 | 12/2015 | Tarasuk-Levin et al. |
| 2017/0206207 A1 | 7/2017 | Bondurant et al. |
| 2020/0319912 A1 | 10/2020 | Vully et al. |

OTHER PUBLICATIONS

Advisory Action mailed Jun. 24, 2019 for U.S. Appl. No. 15/045,179, filed Feb. 16, 2016, 3 pages.
Final Office Action mailed Apr. 12, 2023 for U.S. Appl. No. 16/908,909, filed Jun. 23, 2020, 15 pages.
Final Office Action mailed on Dec. 28, 2017 for U.S. Appl. No. 15/045,179, filed Feb. 16, 2016, 13 pages.
Final Office Action mailed on Mar. 1, 2019 for U.S. Appl. No. 15/045,179, filed Feb. 16, 2016, 15 pages.
Non-Final Office Action mailed on Aug. 1, 2018 for U.S. Appl. No. 15/045,179, filed Feb. 16, 2016, 14 pages.
Non-Final Office Action mailed on Dec. 6, 2019 for U.S. Appl. No. 15/045,179, filed Feb. 16, 2016, 14 pages.
Non-Final Office Action mailed on Jun. 6, 2017 for U.S. Appl. No. 15/045,179, filed Feb. 16, 2016, 14 pages.
Notice of Allowance mailed on Jul. 28, 2023 for U.S. Appl. No. 16/908,909, filed Jun. 23, 2020, 8 pages.

* cited by examiner

TRANSITIONING VOLUMES BETWEEN STORAGE VIRTUAL MACHINES

RELATED APPLICATIONS

This application claims priority to and is a continuation of U.S. application Ser. No. 16/908,909, filed on Jun. 23, 2020, now allowed, titled "TRANSITIONING VOLUMES BETWEEN STORAGE VIRTUAL MACHINES," which claims priority to and is a continuation of U.S. Pat. No. 10,725,806, filed on Feb. 16, 2016, titled "TRANSITIONING VOLUMES BETWEEN STORAGE VIRTUAL MACHINES," which are incorporated herein by reference.

TECHNICAL FIELD

Examples described herein relate to storage systems, and more specifically, to a system and method for transitioning volumes between storage virtual machines.

BACKGROUND

In modern computer operating systems, physical media such as hard drives and flash storage are divided into logical units of storage called storage objects to conveniently store data, provide features, and abstract the underlying hardware. However, different operating systems and even different versions or modes of the same operating system can organize these storage objects in incompatible formats. Typically, if a user wants to migrate data stored in such storage objects from one format to another, the user must copy the data from physical media with storage objects organized in an old format to separate physical media with storage objects in the new format. This requires twice the physical storage capacity as there are data. In addition, when a large quantity of data needs copying, the copying process can require hours, days, or even weeks.

DETAILED DESCRIPTION

Figure 1A:
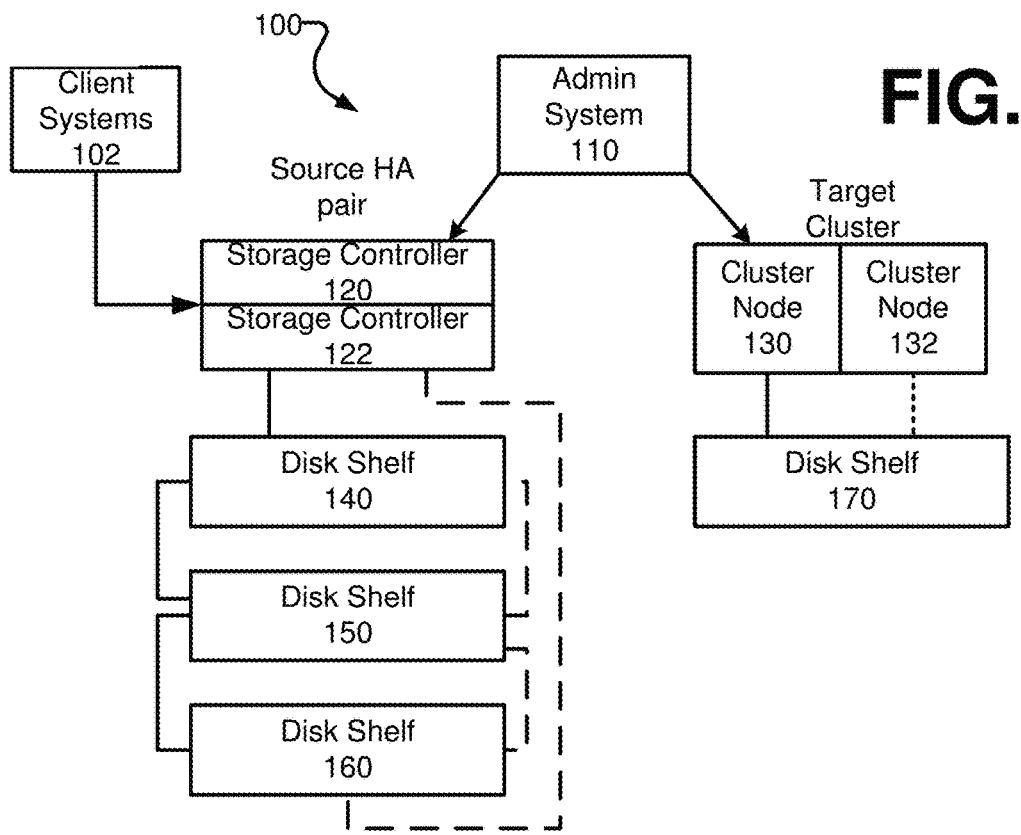
FIG. 1A illustrates an example arrangement of a storage environment in which aspects of a copy-free transition of storage objects can be applied.

Examples describe a method of copy-free transition which helps users to migrate data and configurations from a previous operating format to a target operating format without requiring the data to be copied from one set of storage objects to another. This can be performed by disconnecting disk shelves containing the storage objects from a source storage system and connecting them to a target storage system. A copy-free transition tool can convert the previous operating format storage objects (e.g., aggregates, volumes, logical disks) to the target operating format. Since the data itself is not copied during this type of transition, examples recognize the importance of ensuring that no data loss occurs and preserving the ability to roll back any changes.

Examples of in-place conversion from the previous operating format to a target operating format allow users to detach the disk shelves from the previous operating format controllers and attach them to cluster nodes in a target cluster. Once the disk shelves are attached to the cluster nodes, disk ownership is assigned and aggregates and volumes can be converted in-place. This copy-free transition process enables users to migrate their data in a more cost effective and storage efficient manner compared to conventional methods. In addition, storage features such as data deduplication are preserved.

Examples recognize that a copy-free transition requires a longer disruption to data access than copy-based migration. However, the total time taken to perform the data transition is faster because no data copying is required. In addition, the time taken for converting storage objects between operating formats is not dependent on the size of the storage objects. For example, the time needed for converting a 10 GB aggregate to the target cluster operating format is the same as the time required for converting a 100 TB aggregate.

Since copy-free transitions copy configurations and convert storage objects while these objects are offline, a copy-free transition involves longer service outages than a conventional data migration. As a result, it is important for server administrators to plan for application downtime. In order to help plan this, a copy-free transition tool can estimate the amount of time that a cutover may take for a given storage system configuration.

Further examples describe a method of migrating volumes between storage virtual machines (SVMs) without data copy. Volumes are an integral part of an SVM in a cluster, and once created are dedicated to their container SVM. However, users may require data re-organization based on workflows, protocols, service level agreements, etc. Rather than copying data to a new volume in the target SVM, examples enable volumes to be re-hosted from one SVM to another SVM. Among other benefits, volume rehosting maintains volume configuration details and does not require a re-initialization of the volume after migration.

Examples recognize that data in an SVM needs to be tested before it goes into production. A copy-free volume re-host method allows the user to create flex clone volumes in the SVM and re-host them to a test SVM. The user can then test the data in the second SVM before transferring it to a production environment. As a result, a user can take advantage of storage efficiency provided by the flex clone while serving the clone from the test SVM.

Examples further provide for the migration of volumes between SVMs in different IPSpaces without copying data. This enables the migration of volumes from one SVM of one IPSpace to another SVM of another IPSpace along with their configurations.

Examples further provide for the migration of volumes from one SVM to another SVM, resulting in two SVMs merged into one SVM without the need for copying data. Examples also provide for distributing volumes of one SVM among other SVMs, resulting in an SVM split without copying data.

Data can also be reorganized into SVMs during or after a copy-free transition from source storage controllers to a target cluster in a different format. Examples also enable the restoration of Single System Images of fiber channel (FC) logical unit numbers (LUN) from the previous operating format physical storage systems by migrating the volumes of two SVMs to one SVM. This helps in retaining the tenancy model of the FC LUNs which was supported on the previous operating format systems.

According to some aspects, a volume rehost tool can migrate a storage volume from a source virtual server within a distributed storage system to a destination storage server within the distributed storage system. The volume rehost tool can prevent client access to data on the volume through the source virtual server until the volume has been migrated to the destination virtual server. The tool identifies a set of storage objects associated with the volume, removes configuration information for the set of storage objects, and removes a volume record associated with the source virtual server for the volume. The tool can then create a new volume record associated with the destination virtual server, apply the configuration information for the set of storage objects to the destination virtual server, and allow client access to the data on the volume through the destination virtual server.

In some aspects, the volume rehost tool applies configuration information as necessary for each of the storage objects to the destination SVM. The volume is junctioned for NFS client access, and CIFS shares are created for CIFS access. LUN mappings are unmapped in the context of the source SVM and re-mapped in the context of the destination SVM. Quota rules are deleted from the source SVM and applied on the destination SVM. Export policies of the volume and quota trees are migrated from the source SVM to the destination SVM. In addition, the configuration information, the volume record, and the new volume record can be stored in a shared database for the distributed storage system.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

Figure 1B:
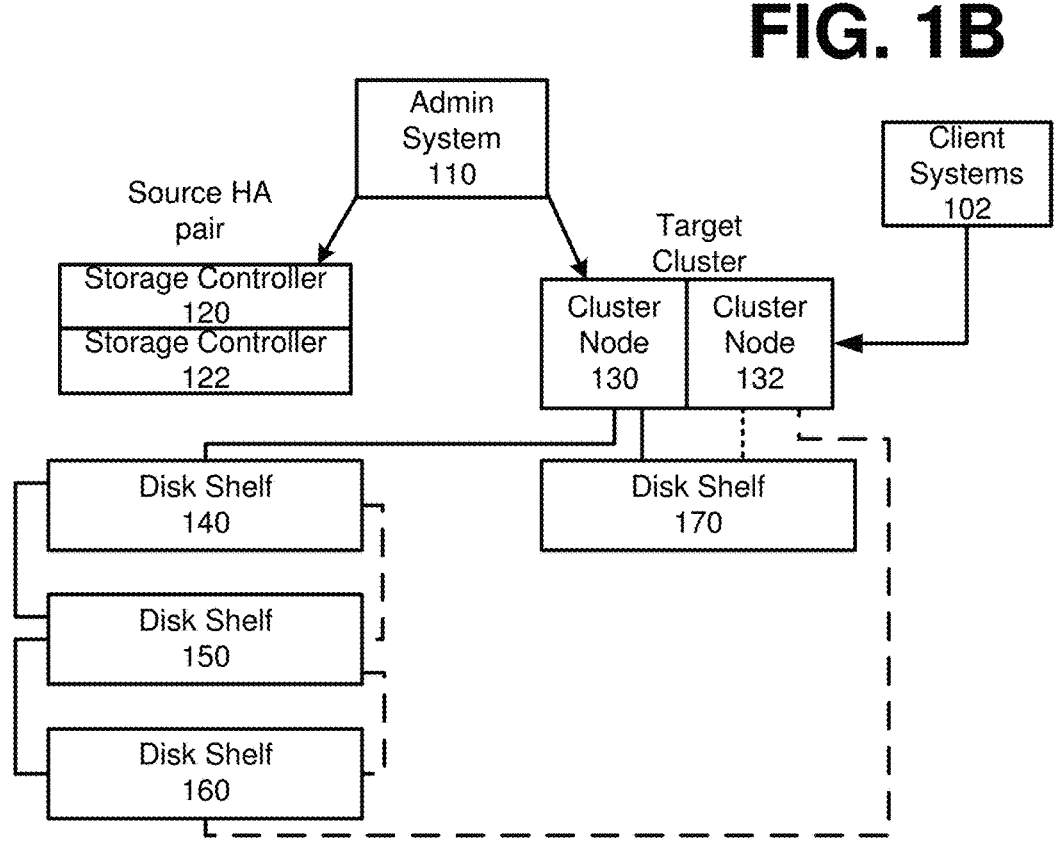
FIG. 1B illustrates an example arrangement of a storage environment after copy-free transition of storage objects is performed, in accordance with some aspects.

FIG. 1A illustrates an example arrangement of a storage environment 100 in which aspects of a copy-free transition of storage objects can be applied. FIG. 1B illustrates an example arrangement of a storage environment 100 after copy-free transition of storage objects is performed, in accordance with some aspects. The storage environment 100 includes an admin system 110 that interfaces with a source pair of storage controllers 120, 122 in a high-availability (HA) mode arrangement and a target cluster of cluster nodes 130, 132. The admin system 110 transitions configuration information from the source pair to the target cluster, including configuration information for storage objects (e.g., volumes, logical disks, aggregates) in disk shelves 140, 150, 160. In a copy-free transition, the admin system 110 issues commands to convert storage objects in disk shelves 140, 150, 160 from a format compatible with the source pair to a format compatible with the target cluster without copying the data in the storage objects. With the disk shelves 140, 150, 160 connected to the target cluster, cluster nodes 130, 132 can access data in the storage objects. Copy-free transition significantly reduces migration costs by enabling the reuse of disk shelves. Furthermore, the overall duration for performing the transition is reduced because data stored on drives in the disk shelves 140, 150, 160 are not copied.

In some aspects, the unit of a copy-free transition is a pair of storage controllers arranged in a high-availability (HA) pair. In the example of FIGS. 1A and 1B, storage controllers 120, 122 are the source HA pair, and cluster nodes 130, 132 represent a target HA pair in a distributed storage system. In other aspects, the distributed storage system, or target cluster, can comprise four or more cluster nodes arranged in HA pairs, or a copy-free transition can be adapted for a single source controller and a single target node. In the two-node cluster example of FIGS. 1A and 1B, the admin system 110 can configure cluster nodes 130, 132 to stop serving data to any client systems 102 during the copy-free transition in order to avoid potential data loss. However, in examples where the target cluster contains more than two nodes, the additional clusters that do not participate in the copy-free transition can continue serving data as normal.

For a two-node cluster, a disk shelf 170 cabled to the target cluster can contain an aggregate to host the root volumes of storage virtual machines (SVM) on the cluster nodes 130, 132. In some examples, this aggregate does not contain any data volumes. For a cluster with four or more nodes, the root volumes of the SVMs can be hosted either on the target nodes for transition or other nodes in the cluster. With four or more nodes, the target HA pair only includes the root aggregates, but other nodes in the cluster can be serving data from other aggregates on disk shelf 170 or other shelves not illustrated. In some aspects, the target cluster is set up and the target cluster nodes 130, 132 are joined to the cluster prior to beginning a copy-free transition of storage objects. In addition, the SVMs are created and assigned to an IPspace.

Prior to initiating a copy-free transition, disk shelves 140, 150, 160 are physically cabled to the source HA pair (illustrated in FIG. 1A). During the transition, these cables are disconnected from the source HA pair and connected to the target cluster so that cluster nodes 130, 132 have access to the shelves and the data stored on them. In some aspects, a user performs this procedure manually after the source HA pair exports configuration information and before the target cluster imports the configuration information. Once the disk shelves 140, 150, 160 are connected to the target cluster and the storage objects in the disk shelves are converted and configured into a format compatible with the target cluster, cluster nodes 130, 132 can access data in the storage objects and serve requests for data received over a network from client systems 102 (illustrated in FIG. 1B).

In the example illustrated in FIG. 1A, three disk shelves 140, 150, 160 are cabled to the source HA pair. However, a copy-free transition can be performed with any number of disk shelves. In some aspects, disk shelves are rack-mounted drive enclosures with one or more controllers for data access and transfer. The shelves can contain any number and configuration of storage media devices, including hard disk drives (HDD), solid state drives (SSD), flash media drives, etc. In addition, copy-free transitions support the transition of devices in network attached storage (NAS) and storage area network (SAN) configurations.

Admin system 110 is a computing device that executes a transition tool to manage the workflow of the copy-free transition process. The admin system 110 can issue commands and transfer data between the source HA pair and target cluster. In some aspects, a user accesses the admin system 110 over a network and the admin system 110 communicates with the storage controllers 120, 122 and cluster nodes 130, 132 over the same or a different network. In other aspects, the admin system 110 is a user's personal computer and runs the transition tool directly. This can be performed over a network or through a physical connection to the storage controllers 120, 122 and cluster nodes 130, 132.

Figure 2:
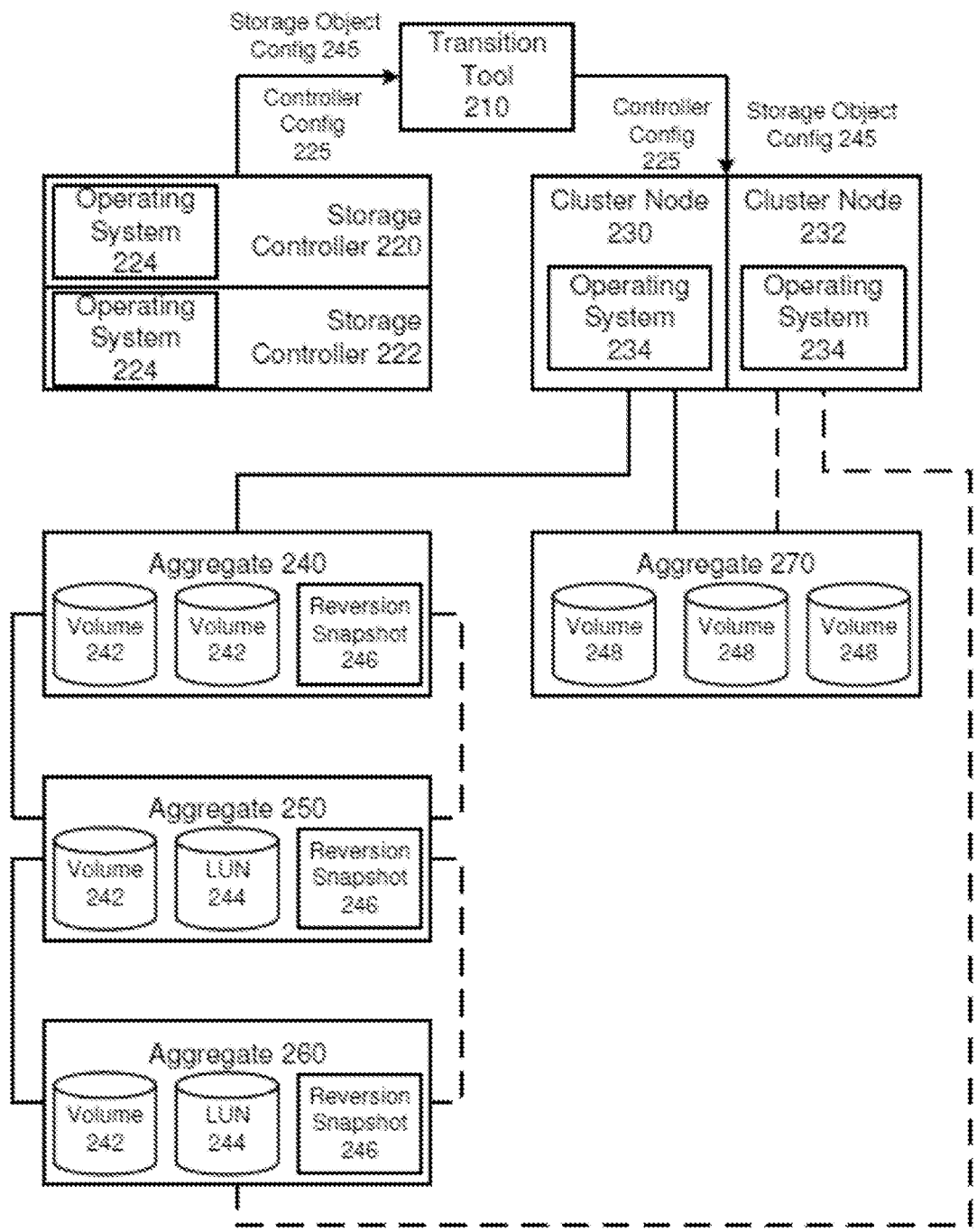
FIG. 2 illustrates an example system for the copy-free transition of storage objects, in accordance with some aspects.

FIG. 2 illustrates an example system for the copy-free transition of storage objects, in accordance with some aspects. Transition tool 210 can reside on admin system 110 and execute to perform the copy-free transition process. In some examples, the transition process consists of the following phases: planning, storage virtual machine (SVM) configuration/provisioning, exporting and halting, cabling, importing, pre-commit including preproduction testing and starting production, and committing. FIG. 2 generally illustrates a copy-free transition import phase wherein the disk shelves are cabled to the cluster nodes 230, 232.

In some aspects, the source HA pair of storage controllers 220, 222 run an operating system 224. The target HA pair of cluster nodes 230, 232 run an operating system 234 which formats storage objects (e.g., volumes, logical disks, aggregates) in a manner incompatible with the format that operating system 224 uses. These operating systems may be different versions of the same operating system, incompatible modes of the same operating system, or different operating systems altogether. Therefore, in order for the operating system 234 of the cluster nodes 230, 232 to use the data stored on storage objects originally created by the operating system 224 of storage controllers 220, 222, transition tool 210 performs a transition process on the storage objects. Since the cluster nodes 230, 232 can then read data in the transitioned storage objects without having to copy them, the transition is referred to as copy-free.

In some aspects, transition tool 210 retrieves controller configurations 225 and storage object configurations 245 from the storage controllers 220, 222 prior to re-cabling the disk shelves. Controller configurations 225 can include settings for operating system 224 and virtual machines provisioned on the controllers. Examples of controller configurations 225 are DNS configurations, LDAP configurations, NIS configurations, users, and group settings. Transition tool 210 can transfer the controller configurations 225 to the cluster nodes 230, 232 prior to re-cabling the disk shelves. In addition, cluster nodes 230, 232 can apply the controller configurations 225 prior to re-cabling.

Cluster nodes 230, 232 can host one or more storage virtual machines (SVM), which are logical constructs that control data access to the storage objects. An SVM is a secure, virtualized storage container that includes its own administration security, IP addresses, and namespace. An SVM can include volumes residing on any node in the cluster, and a cluster can host any number of SVMs. Each SVM enables one or more SAN (FC, FCoE, ISCSI) and/or NAS (NFS, pNFS, CIFS) access protocols and contains at least one volume and at least one logical interface (LIF).

In some aspects of copy-free transition, transition tool 210 converts configurations for each virtual server on storage controllers 220, 222 to one SVM on cluster nodes 230, 232. Volumes 242 associated with each of the virtual servers are therefore transitioned to the appropriate cluster SVM in a one-to-one relationship. That is, each volume 242 is dedicated to its container SVM. In further aspects, operating system 234 on the cluster nodes 230, 232 can rehost volumes 242 between SVMs after conversions have occurred and configurations applied.

For a two-node cluster, aggregate 270 can host the root volumes 248 of SVMs on the cluster nodes 230, 232. In some examples, aggregate 270 does not contain any data volumes. For a cluster with four or more nodes, the root volumes 248 of the SVMs can be hosted either on the target nodes for transition or other nodes in the cluster.

Transition tool 210 can create backup or reversion snapshots 246 of data for each of the aggregates 240, 250, 260. In the event that the transition process fails or a user requests that the storage objects are reverted to storage controllers 220, 222, transition tool 210 can restore the data on aggregates 240, 250, 260 using the reversion snapshots 246.

After the disk shelves are cabled to cluster nodes 230, 232, transition tool 210 can apply storage object configurations 245. Examples of storage objects include aggregates 240, 250, 260, volumes 242, and logical unit numbers (LUN) 244. Aggregates can comprise one or more RAID groups of physical disks (e.g., HDD, SSD, flash) and represent raw storage space for data. With reference to FIGS. 1A and 1B, aggregate 240 is created on disks that are stored in disk shelf 140. Each disk shelf 140, 150, 160, 170 can contain one or more aggregates that span the disks in that shelf. Volumes 242 and LUNs 244 are logical representations of storage space and can comprise a file system and data. Aggregates 240, 250, 260 can also contain other types of storage objects, such as quota trees, Network File System (NFS) exports, and Common Internet File System (CIFS) shares. Generally, storage objects are logical groupings of data storage on physical media that operating systems create to organize and maintain features/configurations that apply to data written on the physical media.

In order to transition the storage objects, transition tool 210 converts the storage objects into formats compatible with operating system 234 on the target cluster. In a copy-free transition, the time taken for this conversion is not dependent on the size of the aggregates and volumes. For example, the time required for converting a 10 GB aggregate to the target cluster operating format is the same as the time required for converting a 100 TB aggregate.

If the transition fails or a user requests that the storage objects are reverted to storage controllers 220, 222, transition tool 210 can roll back the storage objects to the operating system 224 formats. In addition, transition tool 210 can restore the data on the aggregates 240, 250, 260 to their pre-transition state using the reversion snapshots 246. If some steps of the reversion process require user intervention, transition tool 210 generates a list of those steps and presents it to the user of transition tool 210.

Figure 3:
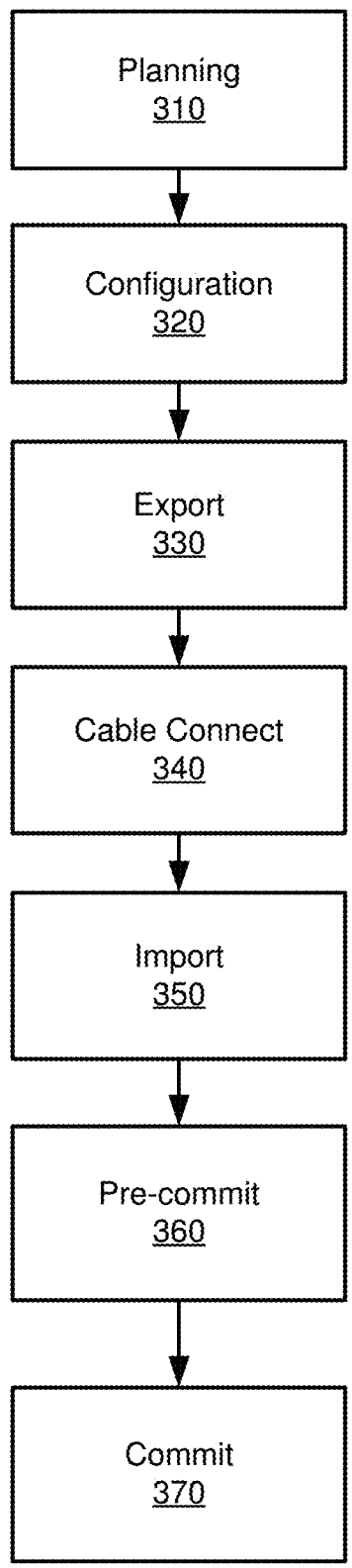
FIG. 3 illustrates phases that may be performed for the copy-free transition of storage objects, in accordance with some aspects.

FIG. 3 illustrates phases that may be performed for the copy-free transition of storage objects, in accordance with some aspects. The copy-free transition process using the transition tool consists of the following phases: planning, storage virtual machine (SVM) configuration/provisioning, exporting and halting, cabling, importing, pre-commit including preproduction testing and starting production, and committing. Copy-free transition is a disruptive operation that takes storage objects offline and makes them temporarily unavailable for client access. Therefore, users must plan for the downtime of applications and workloads running on the source storage systems. A cutover time between storage systems includes the time the transition tool takes to perform two automated operations—the export operation and the import operation—as well as the time taken for manually cabling the disk shelves to the new controllers.

In the planning 310 phase, pre-checks are run to verify whether the source HA pair is ready to be migrated to the target cluster operating format. The transition tool also verifies that the cluster is configured properly and can support the transition. Planning a copy-free transition project involves selecting the source controllers and target cluster nodes, mapping source volumes to a Storage Virtual Machine (SVM), selecting the logical interfaces (LIFs) to be transitioned, and running pre-checks. In some examples, users prepare the data network of the cluster for transition by creating logical ports (virtual LANs and interface groups). If users want the SVMs in the non-default IPspace, users also create the required IPspaces.

To ensure network connectivity after transition, users transition the source IP addresses to a similar network topology in the target cluster operating format. For example, if the source IP addresses are configured on physical ports, the IP addresses are transitioned to appropriate physical ports in the target cluster. Similarly, IP addresses configured on VLAN ports or interface groups are transitioned to appropriate VLAN ports or interface groups in the target cluster.

In some aspects, the transition tool identifies the source HA pair and target cluster using the IP address or fully qualified domain name (FQDN) of each cluster-management interface, source controller, and/or target cluster system. For a source controller, users can specify the IP address of the default virtual filer (vFiler) unit. In addition, users can input administrator credentials for the specified host to allow the transition tool permission to access storage controllers and cluster nodes.

The transition tool can run prechecks to identify any issues, including errors and warnings, before the transition starts. For example, prechecks verify that the source storage controllers, target cluster nodes, and configurations are valid for the transition. If the prechecks detect errors, the transition tool can generate a report displaying the errors to a user. The transition tool can also correct any correctable errors and present potential solutions to other errors in the report. In some aspects, the transition tool can proceed with the transition despite warnings; otherwise, users of the transition tool can resolve all warnings before proceeding with the transition. Resolving might require resolving the source issue of the warning message, implementing a workaround, or acknowledging the result of the issue.

After planning the transition project, the transition tool can enter a configuration phase 320 where it receives requests to perform tasks, such as adding licenses, creating the CIFS server, and creating SAN LIFs to prepare the cluster and SVMs for transition. The transition tool can then apply the configurations on the SVMs. Source controller or vFiler unit level configurations are transitioned to the mapped SVM. In some aspects, volume and LUN configurations are not transitioned during this phase; they are transitioned in the import phase.

Examples of configurations applied on the SVMs in the configuration phase include name services such as DNS configuration, LDAP configuration, NIS configuration, name service switch configuration (/etc/nsswitch.conf and /etc/resolv.conf), hosts configuration (/etc/hosts), UNIX users and groups (/etc/group and /etc/passwd), and Netgroups configuration (/etc/netgroup). NFS, CIFS, and SAN configurations can also be applied during this phase.

Existing source IP addresses that are selected for transition are created in the administrative down state, and during the import phase, these IP addresses are configured in the administrative up state. In addition, new IP addresses are created in the administrative up state.

At the end of this phase, the transition tool can prepare a report and allow users to verify the configurations applied to SVMs and make any necessary changes.

The export phase 330 starts the cutover window for copy-free transition wherein the storage objects being transitioned are not available to clients. In this phase, the transition tool collects system information, disk shelf details, and storage configurations from the source systems, and then halts the source storage systems.

Clients are disconnected from the source systems (i.e., by unmounting NFS exports, disconnecting CIFS shares, and shutting down SAN hosts), but the applicable NAS and SAN services remain running on the source HA pair so that the transition tool can collect the volume-level configurations from the source systems. In some aspects, during the export phase 330, the transition tool collects volume and storage configurations, creates a reversion snapshot of each transitioning aggregate (to allow a rollback if necessary), boots the source controllers in maintenance mode, removes disk ownerships from the source controllers, and disables disk auto-assignment on the target cluster nodes. Examples of commands that the transition tool can run during maintenance mode include: mailbox destroy, disk remove ownership, delete SCSI persistent reservations, change SAS disk shelf IDs (collision case), and change bootarg to stop console messages. In some aspects, the transition tool automatically changes any disk shelf IDs that are shared with disk shelves already present on the target cluster.

In the cable connect phase 340, users disconnect the source disk shelves and hot-add them to the target cluster nodes. The transition tool detects the availability of the required number of ports on the target cluster nodes during precheck. If ports are not available, users can add a new expansion card and connect the disk shelves in a new stack to the target cluster nodes in a multipath configuration. Alternatively, the disk shelves can be connected to the existing stack in a multipath configuration.

After the disk shelves are connected to the target cluster nodes, users power cycle the disk shelves. In some aspects, users can verify the cabling with a configuration advisor that performs configuration validation and health checks. In some aspects, the configuration advisor is a component of the transition tool.

After verifying the cabling and resolving any issues, the transition tool executes the import phase 350. In this phase, the disk ownership is assigned to the mapped cluster nodes. Storage objects and the associated configurations are transitioned during this phase, which includes converting them to the target cluster operating format. The transition tool can perform the following operations in the import phase:

1. Assign source disks to the mapped target cluster nodes;
2. Convert source aggregates, volumes, and LUNs to the target cluster operating format;
3. Configure logical interfaces on the SVMs in the administrative up state;
4. Apply volume-level and LUN-level configurations.

In some aspects, the transition tool can proceed with the import phase even if disks in one of the disk shelves fail. For example, the transition tool can recover aggregates using spare disks in the disk shelf. If disks are missing or aggregates cannot be recovered, the transition tool can cancel the import.

In the pre-commit phase 360, users test the transitioned aggregates, volumes, and configurations that were applied to the target SVMs. Users can also perform tasks for completing the configuration, e.g., configuring hosts and performing host remediation for SAN hosts. Users also test applications and workloads before starting data access in a production environment.

During this phase, users cannot perform certain operations on the transitioned aggregates or volumes, and other operations are not recommended. This is to ensure a successful rollback operation in case users decide to roll back to the source mode.

In some aspects, the transition tool prevents users from moving volumes to the transitioned aggregates. Users can move volumes from the transitioned aggregates to aggregates in the cluster. In addition, the transition tool can prevent users from copying or moving LUNs to the transitioned volumes, but users are allowed to copy or move LUNs from the transitioned volumes to other volumes in the cluster.

In some aspects, the target cluster prevents creating and destroying aggregates on the target cluster HA pair during this phase. Aggregate-level snapshot copies created during the export phase can be used for rollback and thus the cluster can prevent the destruction of transitioned aggregates in order to preserve rollback functionality. In addition, the target cluster can disallow moving or copying files to the transitioned volumes since any new data is not part of the rollback snapshots. Since the source aggregate-level snapshot copies created during the export operation are required in case of a rollback, the snapshot copies are not deleted automatically when the used space in the aggregate grows.

If a transitioned aggregate runs out of space during the pre-commit phase, the target cluster can dynamically bring the aggregate offline (i.e., unavailable for read or write access by clients) along with its volumes. If dynamic offlining fails, the node can be rebooted and the aggregate left offline. Subsequently bringing the aggregate online may keep the volumes offline. When the aggregate is offline, applications encounter disruptions similar to the volumes themselves being offline.

After testing all workloads and applications, users can start client access to the transitioned data in the production environment. This stage of transition—where production is started but the project is not yet committed—is the final stage of transition when users can decide to roll back to the source mode. This phase should not be prolonged because the probability of running out of space in the transitioned aggregates is higher when new data is written to the volumes. In addition, any new data written to the volumes during this stage will not be available after rollback.

In the commit phase 370, the transition tool deletes the aggregate-level reversion snapshot copies that were created during the export phase. After users commit the source aggregates and complete the transition, the transition tool can no longer roll the storage objects back to the source mode.

Calculating Storage Cutover Time During Transition

Since copy-free transitions copy configurations and convert storage objects while these objects are offline, a copy-free transition involves longer service outages than other types of migration. As a result, it is important for server administrators to plan for application downtime. In order to help plan this, the transition tool can estimate the amount of time that export and import operations will take for a given storage system configuration.

During a copy-free transition, the transition tool makes a number of API calls to both source controllers and the target cluster operating system. Based on the number and type of objects that are involved in the migration, the transition tool estimates the time it takes for the export and import phases. The transition tool does this by assigning weights to each of the source objects. Some of the objects involved include volumes, quota trees, LUNs, quota rules, snapshot schedules, NFS exports, CIFS shares, and ACLs.

Based on the type of object and number of API calls required to transition that type of object, the transition tool assigns a weight to each storage object. For example, the number of API calls required to the source OS and the target cluster OS to transition a volume is more than the API calls required to transition a CIFS share. In this case, volumes are given a higher weight than shares. In one example, volumes are given a weight of 20, quota trees a weight of 10, LUNs a weight of 10, quota rules a weight of 4, snapshot schedules a weight of 4, NFS exports a weight of 5, CIFS shares a weight of 5, and ACLs a weight of 5. In some aspects, these weights can be further modified when a number of storage objects of a certain type exceeds a threshold. For example, the weight applied to each NFS export can increase 10% for each 100 exports in the transition since the time taken to transition exports does not scale linearly.

The transition tool determines the number and type of storage objects that are being transitioned. The transition tool can further determine performance metrics for the source storage controllers and the target cluster nodes. For example, the transition tool can measure the time taken for an API call on each system. Using the weighted scores for each storage object and the time taken for API calls, the transition tool can calculate a total downtime estimate and display it to a user. In addition, the transition tool can measure current performance heuristics for the storage systems and networks involved in the transition and modify the total downtime estimate. For example, high network latency or load can increase the estimate. The downtime estimate can be included in a report generated and displayed on a transition tool user interface on the admin system. This report can also contain a list of storage objects, among other information that may be useful to a user considering a copy-free transition.

Since the storage objects remain unavailable during the cabling process, the transition tool can also estimate the time needed for re-cabling the disk shelves from the source storage controllers to the target cluster. In some examples, the estimate can depend on the number of disk shelves involved in the transition.

Converting Existing Storage Objects to a New Operating Format Without Data Copy

During the import phase of a copy-free transition, storage objects including aggregates and volumes are converted from the source HA pair format to the target cluster format by modifying their metadata. The RAID labels of the aggregates are updated to match the destination controller's version. The data is not touched nor modified as part of this conversion, and the file layout of the storage objects remains intact.

In some aspects, the transition tool executes commands on the target cluster to transition aggregates and then volumes from the old format to the new format. The target cluster operating system can rename each aggregate to match the configuration for the target cluster and then transition each aggregate identified with an aggregate ID and snapshot name. In order to properly transition the aggregate to the new format, the target cluster operating system converts the aggregate's file system for compatibility with the new format, changes a high-availability type, brings the aggregate online, and converts it to the new format. At this point, volumes on the aggregate remain offline. Once this process is successful, the target cluster operating system adds an entry for the aggregate to an aggregate table in a database such as a volume location database (VLDB).

Once all aggregates are online, the transition tool can execute commands to transition each of the volumes on the aggregates. The target cluster operating system requests aggregate identification information from the VLDB and transitions the volumes. The target cluster operating system converts each volume from the old format to the new format, cleans volume-specific attributes associated with the old format and adds volume-specific attributes for the new format. After performing volume level checks, each volume is brought online and a corresponding entry is added to the VLDB.

Avoiding Data Loss During Transition

Since the data on the storage objects is not copied to other disks during a copy-free transition, the transition tool takes measures to protect the integrity of the data on the disks where they reside. In addition, the transition tool can also create and protect a reversion snapshot of the main storage objects in order to preserve the ability to roll back any changes. During the copy-free transition process, there are various conditions, which if not taken care of, could result in a loss of data. These generally include storage space, configuration, and compatibility issues.

In some aspects, the transition tool creates reversion snapshots for each aggregate in the transition (or instructs the source storage system to create them). To reduce the time needed for transition and retain the copy-free nature of the transition, these reversion snapshots are stored on the aggregates themselves. In some examples, the reversion snapshots are stored separately from user data in a space exclusively reserved for snapshots. However, if the snapshot reserve space is exhausted, reversion snapshots can spill into space available for user data.

In some aspects, the transition tool can abort the copy-free transition when the source aggregates are logically or physically out of storage space. The transition tool can also abort the transition if it determines that the source disks or disk shelves are not compatible with the target cluster OS platform and version or if there are any configurations on the source storage system that are not supported in the target cluster OS. To avoid such conditions, the transition tool can proactively perform a number of space and configuration checks both prior to and during the transition. The results of these checks can be displayed to a user overseeing the copy-free transition.

In some examples, the transition tool can abort the transition if available logical space on any of the source aggregates is less than 3%. In addition, the transition tool can abort the transition if any of the source aggregates are 89% physically full and there are snapshots that have spilled into the user data space. The transition tool can also abort the transition if the snapshot spill is more than 4% for any of the source aggregates.

If a problem occurs during the transition or the user cancels the transition, the transition tool can use the source aggregate reversion snapshots for reverse conversion from the target cluster format to the source aggregates and volumes. The aggregates are then reverted to the state captured in the reversion snapshots and kept offline. RAID labels can also be restored, and the rootness of the reverted aggregates is stamped accordingly. The disk ownership is updated as part of the reverse conversion. The reverse conversion is then completed by detaching the disk shelves from the cluster nodes to the source HA pair and rebooting the source HA pair.

In a copy-free transition, the transition tool and storage systems protect the reversion snapshots to preserve the reverse conversion if it becomes necessary or desired. In normal conditions, the source storage system and the target cluster storage system operating systems can be configured to automatically delete aggregate snapshots to create free space. However, this automatic deletion process could delete the reversion snapshot for an aggregate, thereby making a reverse conversion impossible. Therefore, in situations where free space on the aggregate is low, a file layout space management subsystem on the storage system can bring the aggregate offline. In some examples, the transition tool can coordinate this offlining process. Having the aggregate offline prevents the reversion snapshot from being deleted and protects against applications getting un-predictable responses from the system. When the aggregate is brought back online, the transition tool and/or target cluster OS can keep volumes on the aggregate offline and monitor it until additional storage space is added to the aggregate. Once additional storage space is detected, the transition tool and/or target cluster OS can bring the volumes back online so they are available for client requests.

While testing during a pre-commit stage of the transition, the aggregates might run out of space because of write operations that are performed during testing and the extra space required by the reversion snapshots. Therefore, if the free physical space falls below a threshold (e.g., 5% of the total space), the aggregates are taken offline. The transition tool can additionally provide monitoring features to allow users to regularly monitor the free physical space available in the transitioned aggregates to avoid space issues.

In some aspects, the transition tool does not perform a reversion when it detects that new volumes, LUNs, or other storage objects have been created on the transitioned aggregates during the pre-commit phase. The transition tool can instead display a list of the new storage objects to the user. Once the new storage objects are deleted or moved out of the transitioned aggregates, the reversion can proceed.

Transitioning Volumes Between Virtual Machines

In some aspects, the transition tool can include a volume rehost component that enables users to migrate a transitioned volume from one storage virtual machine (SVM) to another SVM without data copy. For example, the rehost operation can enable users to consolidate all volumes that have fiber channel (FC) LUNs to a single SVM, thereby preserving the source single-system image (SSI) semantics. Users can also rehost transitioned NAS volumes. In other aspects, the volume rehost component is included in the cluster node operating system and can function outside the context of a copy-free transition.

Volume rehost is a method of migrating storage resources from one SVM to another SVM within a distributed storage system (e.g., a cluster). This can be performed without any data copy or movement between the SVMs. As a result, volumes available for access in one SVM are made accessible from the destination SVM after migration. Volume configurations such as snapshot policies, export rules, quota rules, etc. are migrated along with the data to the destination SVM. In some aspects, after migration, the data of the volume is no longer accessible through the clients of the source SVM.

Volume rehost is a disruptive process that blocks access to the volume from the source SVM while it occurs. The volume is unjunctioned from the source SVM, and volume operations such as volume move, clone create, single file move on-demand, and copy on-demand are locked until the completion of the volume migration. In addition, the volume can be taken offline to block further data access, and the volume record is removed from the shared cluster database to block management operations on the volume. In some examples, metadata including a new volume Data Set ID (DSID) and Master Data Set ID (MSID) are allocated for the volume. A new volume record is created with the new DSID, MSID and the destination SVM ID in a Volume Location Data Base (VLDB). The volume is then brought back online for data access from the destination SVM.

In some aspects, the volume rehost component applies configuration information as necessary for each of the storage objects to the destination SVM. The volume is junctioned for NFS client access, and CIFS shares are created for CIFS access. LUN mappings are unmapped in the context of the source SVM and re-mapped in the context of the destination SVM. Quota rules are deleted from the source SVM and applied on the destination SVM. Export policies of the volume and quota trees are migrated from the source SVM to the destination SVM.

Methodology

Figure 4:
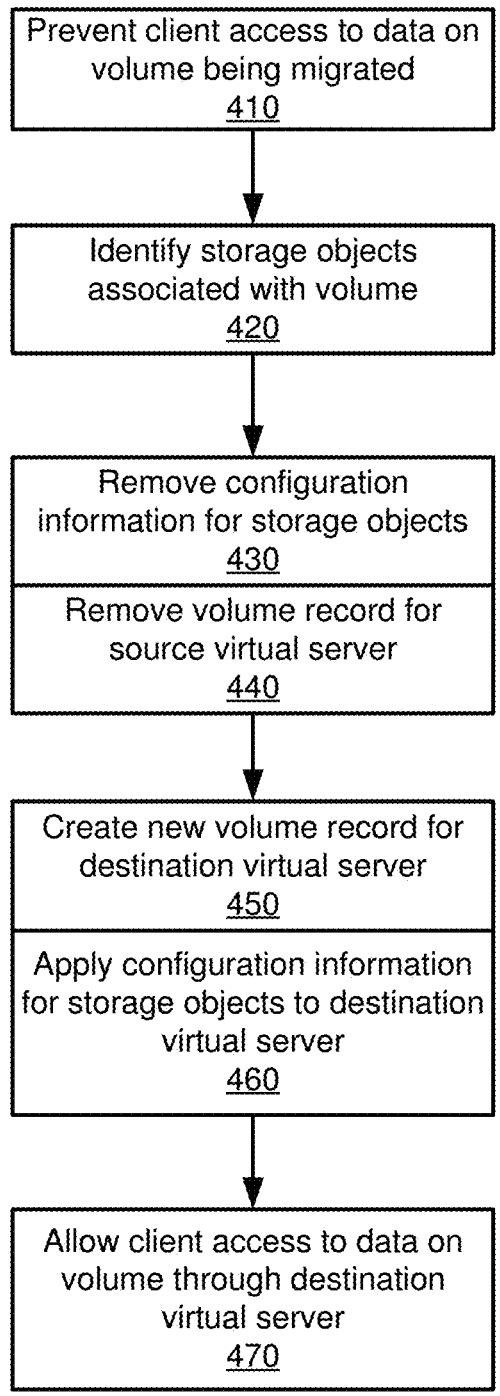
FIG. 4 illustrates a method for transitioning volumes between storage virtual machines, in accordance with some aspects.

FIG. 4 illustrates a method for transitioning volumes between storage virtual machines, according to an aspect. While operations of the method are described below as being performed by specific components, modules or systems of the storage environment 100, it will be appreciated that these operations need not necessarily be performed by the specific components identified, and could be performed by a variety of components and modules, potentially distributed over a number of machines. Accordingly, references may be made to elements of storage environment 100 for the purpose of illustrating suitable components or elements for performing a step or sub step being described. Alternatively, at least certain ones of the variety of components and modules described in storage environment 100 can be arranged within a single hardware, software, or firmware component. It will also be appreciated that some of the steps of this method may be performed in parallel or in a different order than illustrated.

With reference to an example of FIG. 4, a volume rehost component can migrate a storage volume from a source virtual server within a distributed storage system to a destination storage server within the distributed storage system. The volume rehost component can prevent client access to data on the volume through the source virtual server until the volume has been migrated to the destination virtual server (410). The component identifies a set of storage objects associated with the volume (420), removes configuration information for the set of storage objects (430), and removes a volume record associated with the source virtual server for the volume (440). The component can create a new volume record associated with the destination virtual server (450), apply the configuration information for the set of storage objects to the destination virtual server (460), and allow client access to the data on the volume through the destination virtual server (470).

In some aspects, the volume rehost component applies configuration information as necessary for each of the storage objects to the destination SVM. The volume is junctioned for NFS client access, and CIFS shares are created for CIFS access. LUN mappings are unmapped in the context of the source SVM and re-mapped in the context of the destination SVM. Quota rules are deleted from the source SVM and applied on the destination SVM. Export policies of the volume and quota trees are migrated from the source SVM to the destination SVM. In addition, the configuration information, the volume record, and the new volume record can be stored in a shared database for the distributed storage system.

Computer System

Figure 5:
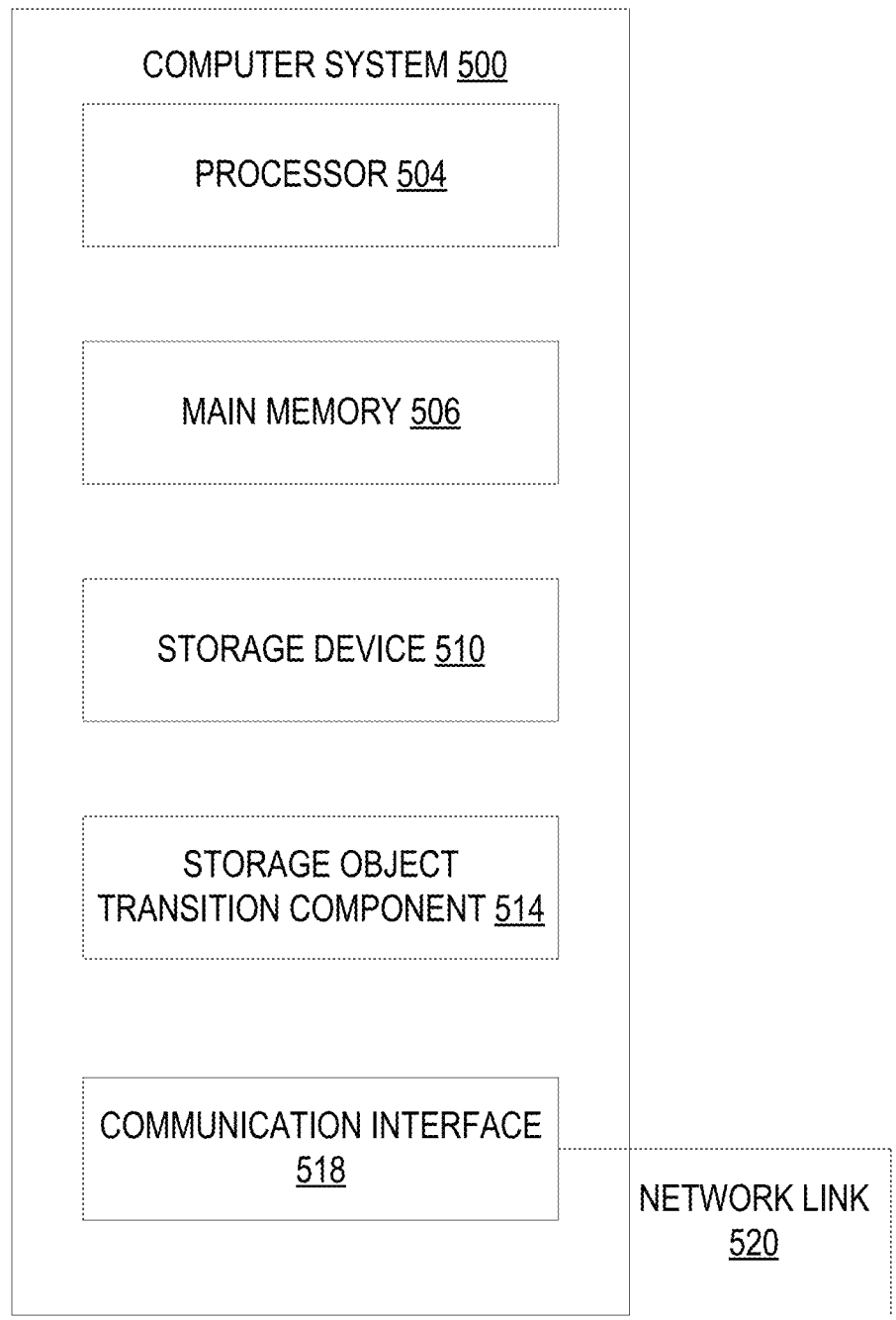
FIG. 5 is a block diagram that illustrates a computer system upon which aspects described herein may be implemented.

FIG. 5 is a block diagram that illustrates a computer system upon which aspects described herein may be implemented. For example, in the context of FIG. 1, admin system 110, client systems 102, storage controllers 120, 122 and/or cluster nodes 130, 132 may be implemented using one or more servers such as described by FIG. 5.

In an aspect, computer system 500 includes processor 504, memory 506 (including non-transitory memory), storage device 510, and communication interface 518. Computer system 500 includes at least one processor 504 for processing information. Computer system 500 also includes the main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. The storage device 510, such as a magnetic disk or optical disk, is provided for storing information and instructions. In addition, computer system 500 can contain a storage object transition component 514, which may include transition logic for requesting or carrying out any of the functions of a copy-free transition of storage objects. The communication interface 518 may enable the computer system 500 to communicate with one or more networks through use of the network link 520 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 500 for implementing the techniques described herein. According to one aspect, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A method executed by one or more processors, comprising:
    initiating a transition of a storage object from a first storage system to a second storage system;
    generating a reversion snapshot of data of the storage object, wherein the reversion snapshot data of the reversion snapshot is stored within at least one of a reserved storage space separated from user data or within a user data space if the reserved storage space is exhausted;
    during the transition, determining that a data object of the storage object is to be reverted back to the first storage system and the transition is to be aborted based upon a threshold amount of the reversion snapshot data being stored within the user data space; and
    to revert the data object to the first storage system, utilizing the reversion snapshot to restore the data of the storage object for providing access to the data object through the first storage system, wherein the reversion snapshot is used to modify the data object back to an operating system format of the first storage system.

2. The method of claim 1, comprising:
    determining that the data object is to be reverted back to the first storage system based upon receiving a user request to revert the data object.

3. The method of claim 1, wherein the storage object is an aggregate.

4. The method of claim 3, comprising:
    blocking moving of files to a transitioned volume of the aggregate based upon the files not being part of the reversion snapshot.

5. The method of claim 3, comprising:
    blocking copying of files to a transitioned volume of the aggregate based upon the files not being part of the reversion snapshot.

6. The method of claim 3, comprising:
    blocking a deletion process from automatically deleting the reversion snapshot, wherein the deletion process is triggered based upon an increase in used space within the aggregate.

7. The method of claim 1, comprising:
    in response to determining that reversion of the data object utilizes user intervention, generating and presenting a list of steps corresponding to the user intervention.

8. A computing device comprising:
    a memory resource to store instructions; and
    one or more processors using the instructions stored in the memory resource to perform operations including:
    initiating a transition of a storage object from a first storage system to a second storage system;
    generating a reversion snapshot of data of the storage object, wherein the reversion snapshot data of the reversion snapshot is stored within at least one of a reserved storage space separated from user data or within a user data space if the reserved storage space is exhausted;
    during the transition, determining that a data object of the storage object is to be reverted back to the first storage system and the transition is to be aborted based upon a threshold amount of the reversion snapshot data being stored within the user data space; and
    to revert the data object to the first storage system, utilizing the reversion snapshot to restore the data of the storage object for providing access to the data object through the first storage system, wherein the reversion snapshot is used to modify the data object back to an operating system format of the first storage system.

9. The computing device of claim 8, wherein the operations comprise:
    determining that the data object is to be reverted back to the first storage system based upon receiving a user request to revert the data object.

10. The computing device of claim 8, wherein the storage object is an aggregate.

11. The computing device of claim 10, wherein the operations comprise:
    blocking moving of files to a transitioned volume of the aggregate based upon the files not being part of the reversion snapshot.

12. The computing device of claim 10, wherein the operations comprise:
    blocking copying of files to a transitioned volume of the aggregate based upon the files not being part of the reversion snapshot.

13. The computing device of claim 10, wherein the operations comprise:
    blocking a deletion process from automatically deleting the reversion snapshot, wherein the deletion process is triggered based upon an increase in used space within the aggregate.

14. The computing device of claim 8, wherein the operations comprise:
    in response to determining that reversion of the data object utilizes user intervention, generating and presenting a list of steps corresponding to the user intervention.

15. A non-transitory computer-readable medium that stores instructions, executable by one or more processors, to cause the one or more processors to perform operations that comprise:
- initiating a transition of a storage object from a first storage system to a second storage system;
- generating a reversion snapshot of data of the storage object, wherein the reversion snapshot data of the reversion snapshot is stored within at least one of a reserved storage space separated from user data or within a user data space if the reserved storage space is exhausted;
- during the transition, determining that a data object of the storage object is to be reverted back to the first storage system and the transition is to be aborted based upon a threshold amount of the reversion snapshot data being stored within the user data space; and
- to revert the data object to the first storage system, utilizing the reversion snapshot to restore the data of the storage object for providing access to the data object through the first storage system, wherein the reversion snapshot is used to modify the data object back to an operating system format of the first storage system.

16. The non-transitory computer-readable medium of claim 15, wherein the operations comprise:
- determining that the data object is to be reverted back to the first storage system based upon receiving a user request to revert the data object.

17. The non-transitory computer-readable medium of claim 15, wherein the storage object is an aggregate.

18. The non-transitory computer-readable medium of claim 17, wherein the operations comprise:
- blocking moving of files to a transitioned volume of the aggregate based upon the files not being part of the reversion snapshot.

19. The non-transitory computer-readable medium of claim 17, wherein the operations comprise:
- blocking copying of files to a transitioned volume of the aggregate based upon the files not being part of the reversion snapshot.

20. The non-transitory computer-readable medium of claim 15, wherein the operations comprise:
- in response to determining that reversion of the data object utilizes user intervention, generating and presenting a list of steps corresponding to the user intervention.

* * * * *